US005680752A

United States Patent [19]

Skog

[11] Patent Number: 5,680,752

[45] Date of Patent: Oct. 28, 1997

[54] GAS TURBINE PLANT WITH ADDITIONAL COMPRESSOR

[75] Inventor: Agnar Skog, Finspong, Sweden

[73] Assignee: ABB Carbon AB, Fingspong, Sweden

[21] Appl. No.: 744,322

[22] Filed: Nov. 7, 1996

Related U.S. Application Data

[63] Continuation of Ser. No. 387,928, filed as PCT/SE93/00679, Aug. 17, 1993, abandoned.

[30] Foreign Application Priority Data

Aug. 28, 1992 [SE] Sweden .................................. 9202467

[51] Int. Cl.[6] .......................................... F02C 3/04

[52] U.S. Cl. .......................................... 60/39.02; 60/726

[58] Field of Search .......................... 60/39.02, 39.04, 60/39.161, 39.163, 39.464, 269, 726, 728

[56] References Cited

U.S. PATENT DOCUMENTS

| | | | |
|---|---|---|---|
| 2,365,551 | 12/1944 | Hermitte | 60/39.161 |
| 2,600,235 | 6/1952 | Galliot | 60/726 |
| 2,626,502 | 1/1953 | Lagelbauer | 60/39.161 |
| 3,585,795 | 6/1971 | Grieb | 60/39.163 |
| 4,542,621 | 9/1985 | Andersson et al. | |
| 4,628,687 | 12/1986 | Ström | |
| 4,974,411 | 12/1990 | Brückner et al. | |

*Primary Examiner*—Louis J. Casaregola

*Attorney, Agent, or Firm*—Pollock, Vande Sande & Priddy

[57] ABSTRACT

A method of adjusting capacity of air flow to a pressurized combustor in a gas turbine plant having a first compressor driven by a gas turbine, which is in turn driven by gases generated during combustion of a fuel in the combustor is disclosed comprising providing a second compressor located downstream of the first compressor, connecting the second compressor downstream of the first compressor, supplying air to the combustor, in addition to that provided by the first compressor, from the second compressor into an air path downstream of the first compressor, the additional air from the second compressor compensating for an insufficient air flow from the first compressor to achieve optimal air flow at full load operation of the gas turbine plant.

16 Claims, 2 Drawing Sheets

BK
V
16
AC
C
GT
G
A
20
14
12
18
8
10

BK
V
16
AC
G
C
GT
A
22
14
12
8
10

BK
V
16
M
AC
C
GT
G
A
14
12
8
10

LPC
LPT
HPT
HPC
BK
IC
AC
G
A1
A2
A3
V
8
10
12
14
16
alt1
alt2

GAS TURBINE PLANT WITH ADDITIONAL COMPRESSOR

This application is a Continuation of U.S. patent application Ser. No. 08/387,928, filed as PCT/SE93/00679, Aug. 7, 1993 (abandoned).

FIELD OF THE INVENTION

The present invention relates to a gas turbine plant comprising a compressor, a gas turbine and a pressurized combustor.

BACKGROUND OF THE INVENTION

In a gas turbine plant in which pressurized combustion takes place in a combustor, combustion gases are generated which drive a gas turbine. This gas turbine, in turn, drives a compressor which compresses air for pressurizing the combustor. The compressed air is at the same time utilized as combustion air during the combustion. Usually the gas turbine is divided into a high-pressure and a low-pressure turbine. With such a division of the gas turbine, the low-pressure turbine can then, on a separate first shaft, drive a low-pressure compressor for compression of the air in a first stage. The high-pressure turbine then drives, via a second separate shaft, a high-pressure compressor in which air is compressed in a second stage before the air is supplied to the combustor. Between the low-pressure and high-pressure compressors a cooler may be provided for cooling the air after the first stage.

The fuel which is supplied to the combustor consists of gaseous, liquid or solid fuels, for example natural gas, oil or coal, in dependence on the nature of the plant. A PFBC power plant is an example of a plant comprising a gas turbine cycle according to the configuration described above in which a solid fuel, usually pulverized coal, is burnt in a fluidized bed in the combustor.

In a gas turbine plant, an electric generator for generating useful energy is usually connected to the high-pressure turbine by way of a gear. Upon start-up of the plant, it is possible to utilize the generator as electric motor to run up the compressor and hence pressurize the combustor.

When designing a gas turbine plant, the gas turbine and compressor sizes are chosen on the basis of power levels available on the market. This creates a number of different problems which the plant designer has to solve. Some of the problems arising will be described here.

An optimum choice of compressor size to achieve the intended air flow with respect to adaptation to other components in the plant is difficult.

When designing the plant, a compressor size is usually chosen which provides optimal air flow at a low exterior air temperature known at the site of the plant. On the other hand, when higher temperatures prevail at the site, the density of the air will be lower, whereby the air flow through the compressor is reduced.

A small error in dimensioning of the chosen capacity of the compressor cannot be compensated for afterwards by simple means.

As its ordinary compressor ages, the capacity is reduced, which means that the originally calculated flows no longer correspond to reality and cannot be compensated for.

SUMMARY OF THE INVENTION

The present invention relates to a method and a device for supplying additional air to a combustor in a gas turbine plant with the aid of an additional compressor. Air is compressed in the additional compressor and supplied to the combustor by passing the compressed air wholly or partially past the ordinary compressor which delivers air to the compressor for pressurizing the combustor and for maintenance of a combustion in the combustor.

The additional compressor is driven by the gas turbine. If the latter is divided into a high-pressure and a low-pressure turbine, the additional compressor is suitably driven by the high-pressure turbine. The operation of the additional compressor can be performed via a gear or by mounting it on the same shaft as the turbine. Another alternative mode of operation is to mount the additional compressor on the same shaft as the generator via a clutch. A still further variant for operation of the additional compressor is to provide it with its own electric motor.

By distributing additional air to the combustor, the possibility of adaptation to other components in the plant and to the necessary air flow, caused by these components, to the combustion process in the combustor is improved. A possibility is also provided of compensating for the power reduction in the plant caused by the reduced air flow to the combustor at higher exterior air temperatures. Further advantages possibilities are created for readjustment of the air flow capacity for the compressors, which is the case, for example, when the ordinary compressor is incorrectly dimensioned or when a reduction of the air flow occurs because of changes in the ordinary compressor caused by, for example, the aging of the compressor.

BRIEF DESCRIPTION OF THE DRAWINGS

FIGS. **1*a*–1*c*** schematically illustrates a number of variations of a gas turbine plant wherein additional air is supplied to a combustor from an additional compressor.

DESCRIPTION OF THE PREFERRED EMBODIMENTS

With reference to the accompanying drawings, a number of embodiments of the present invention will be described.

In the figures, which schematically illustrate different variations of a gas turbine plant, BK designates a combustor in which a fuel is fired under high pressure. The high pressure is accomplished by means of a compressor C, which compresses air supplied to the combustor BK via an intercept and bypass valve V. Air to the compressor is admitted via the air conduit 8. The combustion gases which are generated in the combustor BK are passed via the intercept and bypass valve V to a gas turbine GT to utilize the energy in the combustion gases, whereupon the consumed waste gases are removed via a waste gas conduit 10. The gas turbine GT is mounted on the same shaft A as the compressor C and thus drives the compressor. On the same shaft A on which the compressor C and the gas turbine GT are mounted, also a gear 12 is arranged. Via this gear 12 the gas turbine GT also drives a generator G for conversion of energy utilized in the gas turbine plant to electrical energy. The intercept and bypass valve V comprises cut-off valves for compressor air to the combustor BK, cut-off valves for supply of combustion gases to the gas turbine GT, and also a bypass conduit with a cut-off valve to provide a possibility of short-circuiting the compressor C and the gas turbine GT.

Figure 1A:
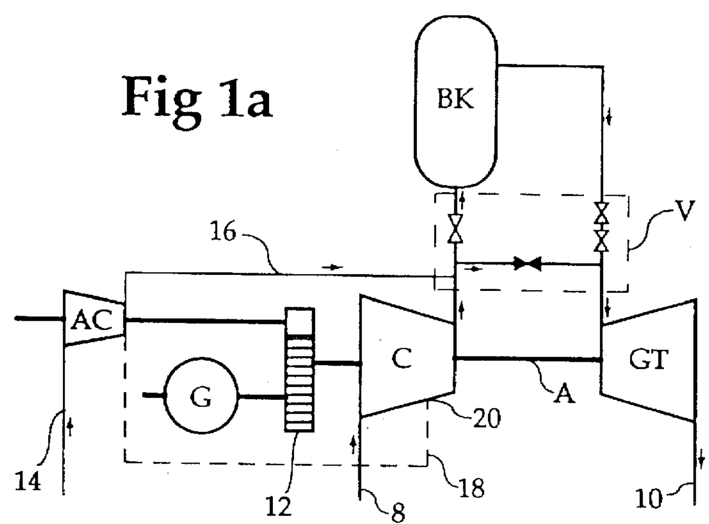
Figure 1B:
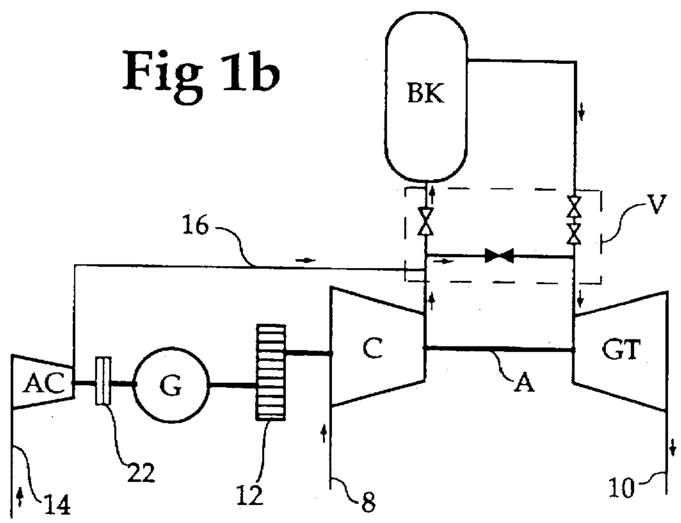
Figure 1C:
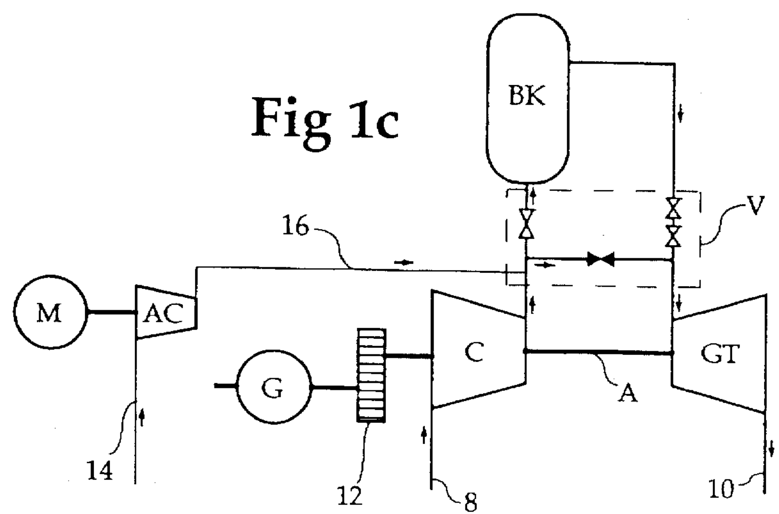
Figure 2:
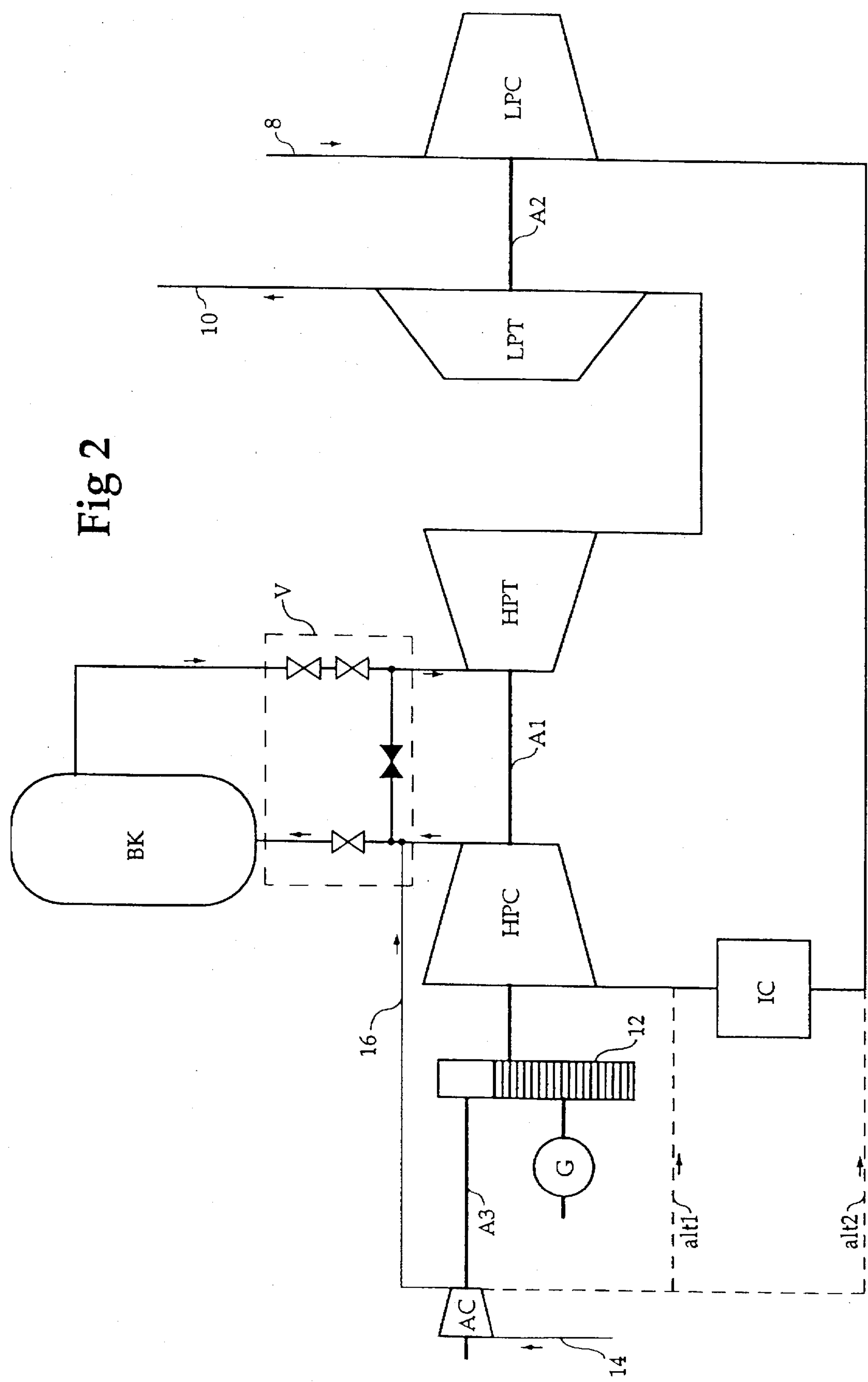
FIG. 2 shows the supply of additional air from an additional compressor to a combustor in a gas turbine plant, in which the gas turbine and the compressor are divided into high-pressure and low-pressure units.

The invention relates to a method and a device for supplying the combustor BK with additional air by means of an additional compressor AC. Air to the additional compressor AC is sucked in via a second air intake 14 and is supplied to the combustor BK. The supply of the additional air to the combustor BK can be arranged in several different ways. The additional air can be passed via a conduit 16, as shown in FIGS. 1 and 2, to the intercept valve V in the same way as the air from the ordinary compressor C, whereupon the additional air is passed to the combustor BK. FIG. 1*a* also shows an embodiment in which the additional air via a conduit 18 is injected into the ordinary compressor C at an injection hole 20 in the compressor C downstream of the air conduit 8, whereby the additional air is further compressed in the compressor C.

The additional compressor AC is driven by the gas turbine GT via the gear 12. As an alternative, the additional compressor AC can be driven by the gas turbine GT via the generator shaft, whereby the additional compressor AC is mounted via a clutch or a gear 22 to the generator shaft according to FIG. 1*b*. In a still further alternative mode of operation, the additional compressor AC can be driven via a separate electric motor M connected to the additional compressor AC, as shown in FIG. 1*c*.

In a preferred embodiment, both the gas turbine GT and the compressor C are divided into several stages according to FIG. 2. In other respects, the embodiment corresponds to the more general connection according to FIGS. 1*a*–1*c*. In the embodiment according to FIG. 2, the combustion gases from the combustor BK drive a high-pressure turbine HPT, which is mounted together with a high-pressure compressor HPC on a first shaft A1. The gases expanded in the high-pressure turbine HPT are passed on to a low-pressure turbine LPT, from which the waste gases from the plant are removed via a waste gas conduit 10. The low-pressure turbine LPT and a low-pressure compressor LPC are mounted on shaft A2. To this low-pressure compressor, air is passed via the air conduit 8, whereafter the air, after compression in the low-pressure compressor LPC, is passed to the high-pressure compressor HPC, where the air is compressed further before it is supplied to the combustor BK via the intercept valve V. After compression of the air in the low-pressure compressor LPC, the air may be cooled in an intermediate cooler IC before being supplied to the high-pressure compressor HPC. The first shaft A1 drives the generator G, via a gear 12, for generating electrical energy.

According to the invention, air is compressed in an additional compressor AC and supplied to the combustor BK together with the air compressed in the high-pressure compressor HPC. Air to the additional compressor AC is taken in via the air intake 14 and passed to the intercept valve V to the same inlet of the valve V through which the compressed air from the high-pressure compressor HPC is fed in. In alternative embodiments of the plant according to FIG. 2, the compressed air is passed from the additional compressor AC to the inlet of the high-pressure compressor HPC downstream of the intermediate cooler IC via the conduit alt1, or upstream of the intermediate cooler IC via the conduit alt2 in dependence on the type of high-pressure compressor and adaptation thereto and to optimize the performance. The generator G in the preferred embodiment according to FIG. 2 is driven according to any of the alternative modes of operation given above; for example, the additional compressor is arranged on an auxiliary shaft A3 connected to the gear 12, whereby the high-pressure turbine HPT drives the additional compressor AC via the gear 12. Direct operation of the additional compressor AC by mounting the additional compressor AC on the same shaft as the shaft of the high-pressure turbine HPT, that is on the first shaft A1, constitutes another operational alternative.

The size of the additional compressor is small relative to the high-pressure compressor HPC normally existing in a gas turbine plant of the kind discussed. As a suggestion, the air flow of the additional compressor AC is chosen to be 10% of the air flow of the high-pressure compressor HPC, a value which is however, in no way critical for the invention.

I claim:

1. A method of adjusting capacity of air flow to a pressurized combustor in a PFBC power plant having a first compressor driven by a gas turbine, which is in turn driven by gases generated during combustion of a fuel in the combustor, said method comprising the steps of:

providing a second compressor connected in parallel with said first compressor; and continuously supplying a constant percentage of air to said combustor, in addition to that provided by said first compressor, from said second compressor into an air path downstream of said first compressor, said additional air from the second compressor compensating for an insufficient air flow from the first compressor to achieve optimal air flow at full load operation of the gas turbine plant.

2. A method according to claim 1 further comprising the step of:

dividing said first compressor into a high-pressure unit and a low-pressure unit upstream of said high-pressure unit; and supplying said air to said combustor from said second compressor downstream of said high-pressure unit of said first compressor.

3. A method according to claim 1 further comprising the step of dividing said gas turbine into a high-pressure unit and a low-pressure unit downstream of said high-pressure unit.

4. A method according to claim 2 further comprising the step of dividing said gas turbine into a high-pressure unit and a low-pressure unit downstream of said high-pressure unit.

5. A method according to claim 2 further comprising the step of connecting an intermediate cooler between said high-pressure unit and said low-pressure unit of said first compressor.

6. A method according to claim 1 further comprising the step of driving said second compressor with said gas turbine by connecting said second compressor directly to a gas turbine shaft.

7. A method according to claim 1 further comprising the step of driving said second compressor with said gas turbine by connecting said second compressor to a gas turbine shaft via a gear.

8. A method according to claim 1 further comprising the step of driving said second compressor with said gas turbine by connecting said second compressor to a gas turbine shaft via a generator shaft for connecting a generator to said gas turbine shaft via a gear.

9. A method according to claim 1 further comprising the step of driving said second compressor with an electric motor.

10. A method according to claim 3 further comprising the step of driving said second compressor by said high-pressure unit of said gas turbine.

11. A device for adjusting air flow capacity to a pressurized combustor in a PFBC power plant having a first compressor driven by a gas turbine, which is in turn driven by gases generated during combustion of a fuel in the combustor, said device further comprising:

a second compressor; and a connection for said second compressor connected in parallel with said first compressor; said second compressor adapted to continuously supply a constant percentage air to the combustor in addition to that provided by said first compressor, said air from said second compressor compensating for an insufficient air flow from the first compressor to achieve optimal air flow at full load operation of the gas turbine plant.

12. A device according to claim 9 wherein said second compressor is driven by said gas turbine.

13. A device according to claim 9 wherein said gas turbine is divided into a high-pressure unit and a low-pressure unit downstream of said high-pressure unit and wherein said second compressor is driven by the high-pressure unit of said gas turbine.

14. A device according to claim 9 wherein said second compressor is driven by an electric motor.

15. A device according to claim 9 wherein said first compressor is divided into a high-pressure unit and a low-pressure unit upstream of said high-pressure unit and said second compressor supplies air to the combustor downstream of the high-pressure unit of said first compressor.

16. A device according to claim 13 wherein said gas turbine plant further comprises an intermediate cooler between the low-pressure unit and the high-pressure unit of said first compressor.

* * * * *